United States Patent [19]
Harmon et al.

[11] Patent Number: 5,575,564
[45] Date of Patent: Nov. 19, 1996

[54] SEAT TRACK APPARATUS

[75] Inventors: Thomas G. Harmon, Rochester Hills; Joseph C. Montano, Troy; Brian D. Pawlowicz, Imlay City, all of Mich.

[73] Assignee: ITT Automotive, Inc., Auburn Hills, Mich.

[21] Appl. No.: 452,155

[22] Filed: May 26, 1995

[51] Int. Cl.$^6$ ................................................ F16C 17/00
[52] U.S. Cl. ............................................................ 384/34
[58] Field of Search ................................. 384/34, 26, 37, 384/41, 42, 20, 21, 22, 23, 47

[56] References Cited

U.S. PATENT DOCUMENTS

| | | | |
|---|---|---|---|
| 2,757,051 | 7/1931 | Wilmer et al. | 384/23 |
| 2,759,773 | 8/1956 | Wilmer et al. | 384/23 |
| 3,062,592 | 11/1962 | Allen | 384/34 |
| 3,847,452 | 11/1974 | Harder, Jr. | 384/47 |
| 4,761,081 | 8/1988 | Mulford | 384/42 X |
| 5,213,300 | 5/1993 | Rees | 248/429 |
| 5,224,749 | 7/1993 | Gauger et al. | 296/65.1 |
| 5,292,164 | 3/1994 | Rees | 296/65.1 |
| 5,303,983 | 4/1994 | Gauger et al. | 297/472 |
| 5,306,073 | 4/1994 | Rees | 297/362.14 |
| 5,316,258 | 5/1994 | Gauger et al. | 248/548 |
| 5,338,100 | 8/1994 | Rees | 297/452.1 |

FOREIGN PATENT DOCUMENTS

| | | | |
|---|---|---|---|
| 2013231 | 2/1973 | Germany | 384/34 |
| 2075133 | 11/1981 | United Kingdom | 384/42 |

Primary Examiner—Thomas R. Hannon
Attorney, Agent, or Firm—Thomas N. Twomey; J. Gordon Lewis

[57] ABSTRACT

A seat track apparatus of a vehicle for retaining a slide member between a lower seat track and an upper seat track of the seat track apparatus. The seat track apparatus provides a channel in the lower seat track having at least one longitudinally extending contact surface. The slide member has a shape complementary to the channel and is disposed within the channel with at least one contact surface in contact with the contact surface of the channel. The slide member provides a plurality of cylindrical pins projecting outward from the side wall of the slide member and extending through apertures in the side wall of the lower seat track. The engagement of the pins by the lower seat track aligns and restricts movement of the slide member in the plane in which the cylindrical pins extend therethrough. In a preferred embodiment, the slide member provides outwardly projections on the bottom wall of the slide member. Apertures provided in the bottom wall of the lower seat track receive the projections extending from the bottom wall of the slide member to maintain contact between the contact surface of the slide and the channel. In a second embodiment, the bottom wall of the lower seat track has a plurality of punched lanced upsets which abut the bottom wall of the slide member and prevent the bottom wall of the slide member from moving away from the channel thus maintaining contact between the contact surfaces of the slide member and the channel.

19 Claims, 2 Drawing Sheets

SEAT TRACK APPARATUS

FIELD OF THE INVENTION

The present invention relates to a seat track apparatus for a vehicle, and in particular, to a seat track apparatus that maintains the position of a slide member between a lower seat track and an upper seat track of a seat track assembly of a motor vehicle.

BACKGROUND OF THE INVENTION

Seat adjusters, both manual and powered, are provided on most automotive vehicles. One of the most common seat adjustments is fore and aft movement of the seat with respect to the vehicle. To provide such fore and aft seat adjustment, the seat assembly is typically mounted on first and second spaced seat track assemblies. Each seat track assembly is formed by a lower seat track anchored to the vehicle floor, and an upper seat track connected to an upper support frame or bottom of a seat assembly wherein the upper seat track is slidably mounted to the lower seat track. To allow the upper seat track to slide with respect to the lower seat track and provide the fore and aft seat adjustment, a bearing or low-friction sliding surface is commonly provided between the metallic surfaces of the upper and lower seat tracks.

Plastic members called "slides" are commonly utilized as low-friction surfaces to reduce the friction between the upper and lower seat tracks of the seat track assembly and provide the fore and aft adjustment of the upper seat track with respect to the lower seat track. Typically, the slides have a shape complementary to both the lower seat track and the upper seat track so as to mate and complement the configuration between the upper and lower seat tracks.

Besides the complementary shape of the slides, the slides are often tenuously held in place within the seat track assembly by a type of retaining feature. One known retaining feature provides cylindrical pins which extend outwardly from the slides and are inserted through corresponding apertures within the side wall of the lower seat track of the seat track assembly. Thus, the cylindrical pins prohibit movement in a plane normal to the longitudinal axis of the pins which includes fore and aft movement of the slide with respect to the lower seat track of the seat track assembly. Linear movement along the longitudinal axis of the cylindrical pins of the slide is generally restrained by the complementary structure of the slide and the upper seat track of the seat track assembly.

It would be desirable to provide a seat track apparatus that retains the slide within the seat track assembly during all phases of the assembly process as well as during all modes of operation. It would also be desirable to provide a seat track apparatus that retains the slide and is inexpensive, does not require additional parts, and does not considerably increase assembly time.

SUMMARY OF THE INVENTION

The present invention provides a seat track apparatus that retains a slide member within the seat track assembly of a vehicle. The seat track apparatus provides a channel defining means having at least one longitudinally extending contact surface. A low-friction slide member, having a shape complementary to the channel means, is disposed within the channel defining means and has at least one contact surface in contact with the contact surface of the channel defining means. A self-locking means for maintaining contact between the contact surface of the slide member and the contact surface of the channel defining means is provided to retain the slide member within the seat track assembly.

In the preferred embodiment, the self-locking means for maintaining contact between the contact surfaces of the slide member and the channel defining means provides the slide member with at least one projection extending from a bottom wall of the slide member. The channel defining means also provides a bottom wall having at least one aperture for receiving the projections of the slide member so as to maintain contact between the contact surfaces of the slide member and the channel defining means.

In an additional embodiment, the self-locking means for maintaining contact between the contact surfaces of the slide member and the channel defining means provides a bottom wall of the channel defining means with at least one raised portion adjacent the bottom wall of the slide member so as to maintain contact between the contact surfaces of the slide member and the contact surfaces of the channel defining means. Preferably, the raised portions of the bottom wall of the channel defining means are formed by punching lanced upsets into the floor of the channel defining means so as to retain the slide member within the seat track assembly.

The present invention also provides the slide member with at least one cylindrical pin integral with and extending from the side wall of the slide member. The channel defining means provides at least one aperture within its side wall for receiving the cylindrical pin of the slide member for aligning and retaining the slide member within a plane normal to the longitudinal axis of the pin.

The present invention may be utilized with a plurality of slide members wherein the slide members are longitudinally spaced along the channel defining means. The present invention may also be utilized to form a lower seat track having a pair of opposing channel defining means with a plurality of slides longitudinally spaced and disposed within said opposing channel defining means wherein a common bottom wall is utilized to form an integral, unitary lower track.

To this end, the objects of the present invention are to provide a new and improved seat track apparatus for maintaining the position of a slide member within a seat track assembly without the use of additional parts or additional assembly time.

BRIEF DESCRIPTION OF THE DRAWINGS

The various features, advantages and other uses of the present invention will become more apparent by referring to the following detailed description and drawings which.

DESCRIPTION OF THE PREFERRED EMBODIMENT

Figure 1:
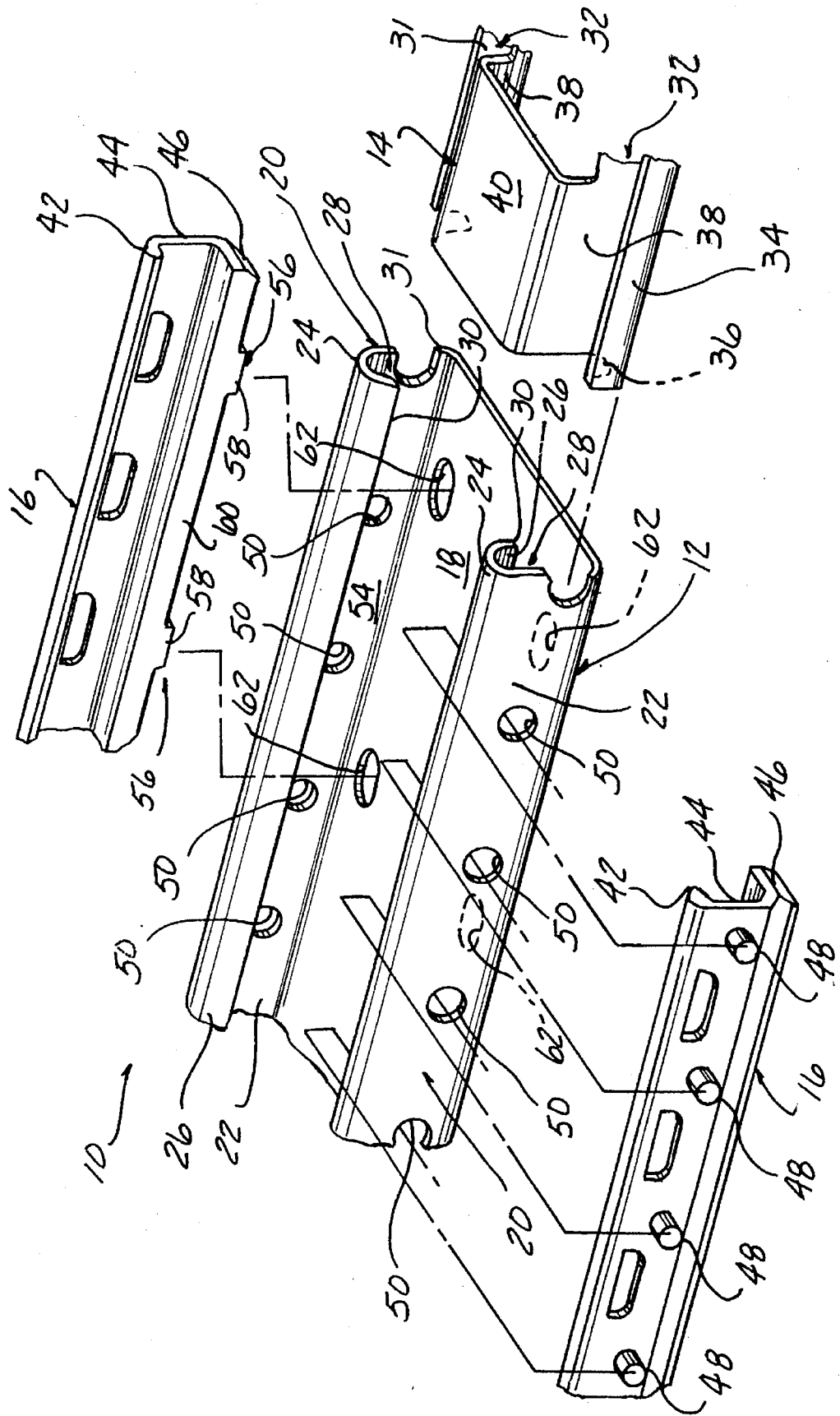
FIG. 1 is an exploded view showing the lower seat track, upper seat track and slide member of the seat track apparatus and showing the preferred embodiment of the self-locking means for maintaining the position of the slide member within the seat track assembly.

FIG. 1 is an exploded view showing a seat track apparatus 10 for a vehicle (not shown). A lower seat track 12 is fixedly mounted to a motor vehicle floor (not shown), and an upper seat track 14 is connected to an upper vehicle support bracket (not shown) or directly to the bottom of a vehicle seat (not shown). A low friction, plastic slide member 16 is disposed between the upper seat track 14 and the lower seat track 12 of the seat track apparatus 10 to provide low-friction fore and aft sliding of the upper seat track 14 with respect to the lower seat track 12.

As seen in FIGS. 1–4, the lower seat track 12 may be formed of an integral, one piece member having a substantially planar bottom wall 18 and a pair of similarly formed side walls 20 extending upwardly from opposite sides of the bottom wall 18. Each of the side walls 20 includes a vertically extending, outer planar side wall 22, a top wall 24 and an inwardly disposed lip or inner wall 26 which extends substantially vertically downward from the top wall 24 and is spaced from the outer side wall 22. The outer side wall 22, the top wall 24 and the inner wall 26 are formed in an inverted J-shape defining a longitudinally extending channel 28. A lower edge 30 of the inner wall 26 is spaced from the bottom wall 18 of the lower seat track 12 to form an elongated slot 31.

At least one slide member 16 is disposed in each channel 28 of the lower seat track 12 wherein a pair of the channels 28 are opposed and joined by the bottom wall 18 to form the lower seat track 12. Each slide member 16 is substantially C-shaped and is complementary to the shape of the channel 28 in the lower seat track 12. The C-shape of the slide member 16 is defined by a top wall 42, a side wall 44 and a bottom wall 46. The slide member 16 is fabricated of a suitable plastic material to provide a smooth sliding surface for the upper seat track 14 which is slidingly disposed within the slide member 16.

The upper seat track 14 provides side walls 32 that are formed in a channel-like configuration complementary to the shape of the channels 28 in the lower seat track 12 so as to enable the upper seat track 14 to be slidably disposed within the lower seat track 12 in sliding contact with the slide member 16. Thus, each side wall 32 of the upper seat track 14 is formed with a substantially J-shaped configuration formed of an outer side wall 34, a lower bottom wall 36 and an inner side wall 38 which extends to a central raised portion 40 of the upper seat track 14. The same channel-like configuration is also provided for the opposite longitudinal side wall 32 of the upper seat track 14.

In order to align and retain the position of the slide member 16 in a limited plane with respect to the lower seat track 12, the slide member 16 provides a plurality of outwardly extending cylindrical pins 48 formed on and extending outwardly from the side wall 44 of the slide member 16. The pins 48 are received by a plurality of apertures 50 formed in the outer side walls 22 of the lower seat track 12. The pins 48 engage and extend through the apertures 50 in the outer side walls 22 of the lower seat track 12 to align and position the slide member 16 within the lower seat track 12. When the pins 48 are extended through the apertures 50 of the outer side wall 22 of the lower seat track 12, the slide member 16 is restrained from moving within the plane defined by the outer side wall 22 of the lower seat track 12 or within a plane normal to a longitudinal axis 52 of the pins 48. Thus, the side wall 44 of the slide member 16 provides a planar contact surface in contact with a planar contact surface formed by the inner surface 54 of the outer side wall 22 of the lower seat track 12. In addition, the bottom wall 46 of the slide member 16 forms a planar contact surface in contact with a planar contact surface formed by the central bottom wall 18 of the lower seat track 12.

Figure 2:
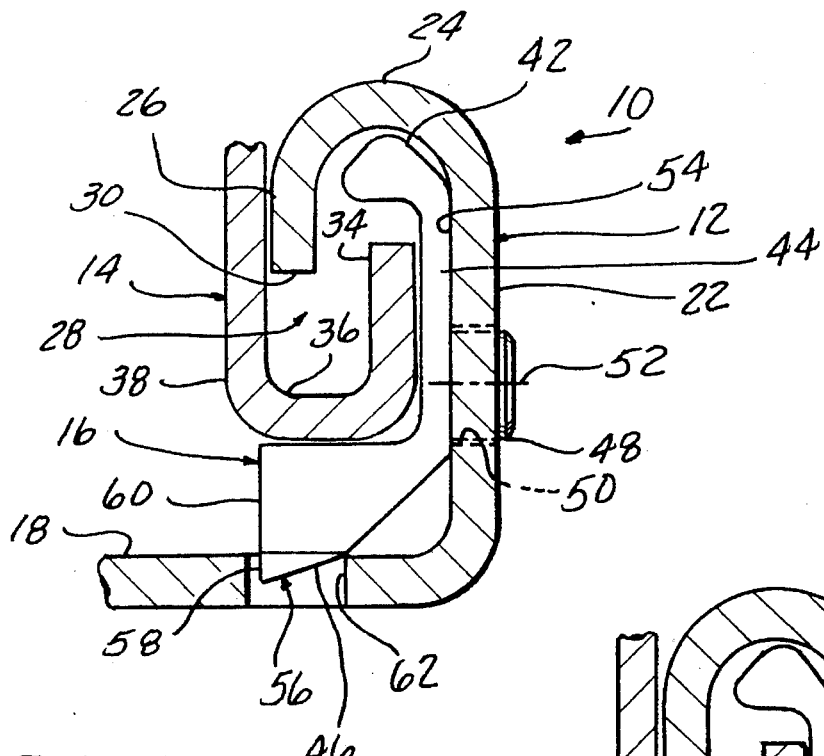
FIG. 2 is a sectional view showing the projections in the bottom wall of the slide member extending into the apertures provided in the bottom wall of the lower seat track for maintaining the position of upsets in the bottom wall of the lower seat track for the slide member within the seat track assembly.
Figure 4:
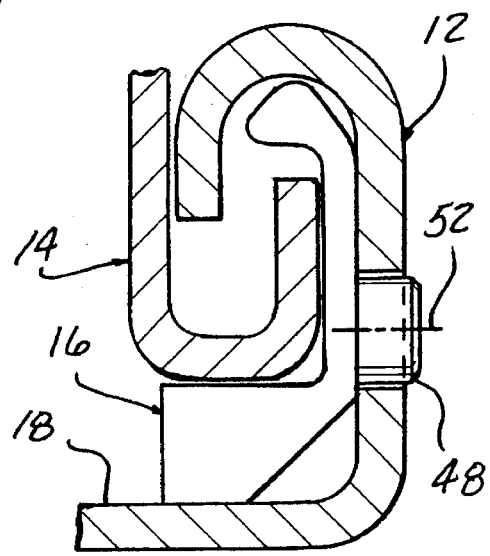
FIG. 4 is a sectional view of the prior art showing the cylindrical pins extending from the side wall of the slide member and extending through the corresponding apertures in the side wall of the lower seat track.

To prevent the contact surfaces of the slide member 16 and the lower seat track 12 from separating due to loads applied by the upper seat track 14 or random forces and vibration from miscellaneous assembly operations and material handling processes, a self-locking means for maintaining contact between the aforementioned contact surfaces is provided, as seen in FIG. 2. In the preferred embodiment, a pair of similar aforementioned contact surfaces is provided, as seen in FIG. 2. In the preferred embodiment, a pair of similar projections 56 are integral with and extend downwardly from the bottom wall 46 of the slide member 16. Each projection 56 ramps downwardly at an acute angle wherein an end face or shoulder 58 is formed continuously with an end face 60 of the bottom wall 18 of the slide member 16. The projections 56 extending from the bottom wall 46 of the slide member 16 are received by oval shaped apertures 62 extending through the bottom wall 18 of the lower seat track 12. The projections 56 of the slide member 16 may only be deep enough to extend through a portion of the aperture 62 so that the projections 56 do not interfere with any mounting surfaces (not shown) that may lie beneath the lower seat track 12. Thus, the projections 56 may abut any portion of the lower seat track 12 defining the apertures 62 to maintain the position of the slide member 16 between the lower seat track 12 and the upper seat track 14 of the seat track apparatus 10. The projections 56 of the slide member 16 within the apertures 62 of the lower seat track 12 in combination with the outwardly extending pins 48 of the slide member 16 received by the apertures 56 of the outer side wall 22 of the lower seat track 12 and the complementary shape of the top wall 42 of the slide member 16 disposed within the channel 28 of the lower seat track 12 ensures that the slide member 16 is retained within the seat track apparatus 10.

Figure 3:
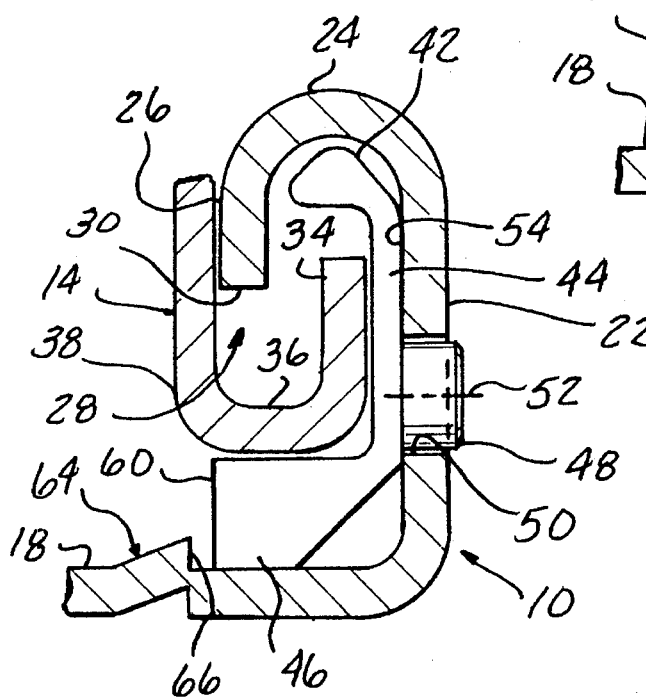
FIG. 3 is a sectional view showing the lanced maintaining the position of the slide member within the seat track assembly.

As seen in FIG. 3, a second embodiment provides self-locking means for maintaining contact between contact surfaces of the slide member 16 and the lower seat track 12 wherein a plurality of raised portions 64 are provided on the bottom wall 18 of the lower seat track 12 adjacent the end face 60 of the bottom wall 46 of the slide member 16. The raised portions 64 of the bottom wall 18 of the lower seat track 12 may be formed by punching lanced upsets into the bottom wall 46 of the slide member 16 and prohibiting the end face 60 of the bottom wall 46 of the slide member 16 from moving past the raised portion 64 of the bottom wall 18 of the lower seat track 12 and away from the side wall 20 of the lower seat track 12. Thus, the end face 60 of the bottom wall 46 of the slide member 16 may abut the cornered edge 66 of the lanced upset of the raised portion 64 of the bottom wall 18 of the lower seat track 12 in order to retain the slide member 16 in the proper position within the seat track apparatus 10.

In operation, the slide member 16 is inserted into the lower seat track 12 of the seat track apparatus 10 by pivoting the top wall 42 of the slide member 16 into the upper portion of the channel 28 of the lower seat track 12. The cylindrical pins 48 extending from the side walls 44 of the slide member 16 are aligned with the apertures 50 provided in the outer side wall 22 of the lower seat track 12, and the slide member 16 is continually pivoted so that the cylindrical pins 48 extend through the apertures 50 in the outer side walls 22 of the lower seat track 12. In the preferred embodiment, the slide member 16 is continually pivoted rearward until the projections 56 extending from the bottom wall 46 of the slide member 16 engage the apertures 62 in the bottom wall 18 of the lower seat track 12. The projections 56 on the slide member 16 may provide a snap fit within the apertures 62 in the bottom wall 18 of the lower seat track 12 such that the slide member 16 is snugly disposed within the lower seat track 12. The upper seat track 14 may then be slidingly inserted into the slide member 16 of the seat track apparatus 10.

In the second embodiment, the top wall 42 of the slide member 16 is similarly pivoted into the upper portion of the channel 28 of the lower seat track 12, and the cylindrical pins 48 of the slide member 16 are aligned and inserted into the apertures 50 provided in the outer side wall 22 of the lower seat track 12. To pivot the bottom wall 46 of the slide member 16 over the lanced upsets 64 in the bottom wall 18 of the lower seat track 12, an interference fit may be provided such that the bottom wall 46 of the slide member 16 may deform slightly when pivoting the bottom wall 46 of the slide member 16 over the lanced upsets 64 in the bottom wall 18 of the lower seat track 12. Since the slide member 16 may be fabricated from a plastic material, the slide member 16 may bend under sufficient force when the slide member 16 is pivoted over the lanced upsets 64, and the slide member 16 flexes back to its original relaxed condition once the bottom wall 46 of the slide member 16 has passed over the lanced upsets 64 in the bottom wall 18 of the lower seat track 12. The upper seat track 14 may then be slidingly inserted into the slide member 16 of the seat track apparatus 10.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A seat track apparatus for a vehicle comprising:
    means for defining a channel having a bottom wall and at least one longitudinally extending contact surface;
    a slide member disposed within said channel defining means and having at least one contact surface in contact with said contact surface of said channel defining means; and
    self-locking means, located along a mid-portion of said bottom wall, for maintaining contact between said contact surface of said slide member and said contact surface of said channel defining means.

2. The seat track apparatus as stated in claim 1, wherein said self-locking means further comprises:
    said slide member having a shape complementary to said channel defining means, and said slide member having a bottom wall; and
    said channel defining means having a side wall integral with and extending from said bottom wall, and said bottom wall having at least one raised portion along said mid-portion of said bottom wall of said channel defining means and adjacent said bottom wall of said slide member to maintain contact between said contact surface of said slide member and said contact surface of said channel defining means.

3. The seat track apparatus as stated in claim 1, further comprising:
    said slide member having a side wall and at least one projection integral with and extending from said side wall; and
    said channel defining means have a side wall with at least one aperture for receiving said projection on said side wall of said slide member for aligning and retaining said slide member with respect to said channel defining means.

4. A seat track apparatus for a vehicle comprising:
    means for defining a channel having at least one longitudinally extending contact surface;
    a slide member disposed within said channel defining means and having at least one contact surface in contact with said contact surface of said channel defining means and said slide member having a shape complementary to said channel defining means, and said slide member having a bottom wall with at least one projection extending from said bottom wall of said slide member; and
    said channel defining means having a bottom wall with at least one aperture for receiving said projection of said slide member to maintain contact between said contact surface of said slide member and said contact surface of said channel defining means.

5. A seat track apparatus for a vehicle comprising:
    a longitudinally extending channel having a bottom wall and at least one longitudinally extending contact surface;
    a slide member disposed within said channel and having a shape complementary to said channel wherein said slide member has at least one longitudinally extending contact surface in contact with said contact surface of said channel; and
    self-locking means, located along a mid-portion of said bottom wall, for maintaining contact between said contact surface of said channel and said contact surface of said slide member.

6. The seat track assembly stated in claim 5, further comprising:
    said channel having a side wall and a top wall wherein said side wall and said top wall form an inverted J-shaped cross-section.

7. The seat track apparatus stated in claim 6, wherein said self-locking means further comprises:
    said slide member having a substantially C-shaped cross-section with a bottom wall adjacent said bottom wall of said channel; and
    said bottom wall of said channel having at least one raised portion along said mid-portion of said bottom wall of said channel and adjacent said bottom wall of said slide member to maintain contact between said contact surface of said slide member and said contact surface of said channel.

8. The seat track apparatus stated in claim 7, further comprising:
    said slide member having a side wall and at least one cylindrical pin integral with and extending from said side wall of said slide member; and said side wall of said channel having at least one cylindrical aperture for receiving said cylindrical pin of said slide member for aligning and retaining said slide member within said channel.

9. A seat track apparatus for a vehicle comprising:

a longitudinally extending channel having a bottom wall, a side wall and a top wall and at least one longitudinally extending contact surface;

a slide member disposed within said channel and having a shape complementary to said channel wherein said slide member has at least one longitudinally extending contact surface in contact with said contact surface of said channel;

said slide member having a substantially C-shaped cross-section with a bottom wall adjacent to said bottom wall of said channel and having at least one projection integral with and extending downwardly from said bottom wall of said slide member; and said bottom wall of said channel having at least one aperture for receiving said projection of said slide member for maintaining contact between said contact surfaces of said slide member and said channel.

10. The seat track apparatus stated in claim 9, further comprising:

said slide member having a side wall and at least one cylindrical pin integral with and extending from said side wall of said slide member; and said side wall of said channel having at least one cylindrical aperture for receiving said cylindrical pins of said slide member for aligning and retaining said slide member within said channel.

11. The seat track apparatus stated in claim 5, further comprising:

said channel having a plurality of said slide members longitudinally spaced along said channel.

12. A seat track apparatus stated in claim 5, further comprising:

an integral and unitary lower track having a pair of said channels joined by a common bottom wall for forming said integral and unitary lower track.

13. A seat track apparatus of a vehicle comprising:

a longitudinally extending channel having at least one longitudinally extending planar contact surface and having a bottom wall, a side wall and a top wall wherein said side wall and said top wall form an inverted J-shaped cross-section;

a slide member disposed within said channel and having a shape complementary to said channel wherein said slide has a bottom wall and a side wall with at least one longitudinally extending planar contact surface in contact with said planar contact surface of said channel; and self-locking means, located along a mid-portion of said bottom wall of said channel, for maintaining contact between said planar contact surface of said channel and said planar contact surface of said slide member.

14. A seat track apparatus of a vehicle comprising:

a longitudinally extending channel having at least one longitudinally extending planar contact surface and having a bottom wall, a side wall and a top wall wherein said side wall and said top wall form an inverted J-shaped cross-section;

a slide member disposed within said channel and having a shape complementary to said channel wherein said slide has a bottom wall and a side wall with at least one longitudinally extending planar contact surface in contact with said planar contact surface of said channel;

said bottom wall of said channel having at least one vertically raised lanced portion adjacent an end face of said bottom wall of said slide member to prohibit said end face of said bottom wall of said slide member from moving past said vertically raised lanced portion and to maintain contact between said planar contact surfaces of said slide member and said channel.

15. The seat track apparatus stated in claim 14, further comprising:

said slide member having a side wall and at least one cylindrical pin having a longitudinal axis, and said cylindrical pin being integral with and extending from said side wall of said slide member; and said side wall of said channel having at least one cylindrical aperture for receiving said cylindrical pin of said slide member for aligning and retaining said slide member in a plane normal to said longitudinal axis of said cylindrical pin.

16. The seat track apparatus stated in claim 14, further comprising:

said channel having a plurality of said slide members longitudinally spaced along said channel.

17. The seat track apparatus stated in claim 14, further comprising:

an integral and unitary lower track having a pair of said channels substantially parallel and opposing one another and having a common bottom wall forming said integral and unitary lower track.

18. A seat track apparatus of a vehicle comprising:

a longitudinally extending channel having at least one longitudinally extending planar contact surface and having a bottom wall, a side wall and a top wall wherein said side wall and said top wall form an inverted J-shaped cross-section;

a slide member disposed within said channel and having a shape complementary to said channel wherein said slide has a bottom wall and a side wall with at least one longitudinally extending planar contact surface in contact with said planar contact surface of said channel;

at least one projection integral with and extending downwardly from said bottom wall of said slide member wherein a wide portion of said projection extends continuously downward from said end face of said bottom wall of said slide; and said bottom wall of said channel having at least one aperture extending therethrough for receiving said projection of said slide member for maintaining contact between said planar contact surfaces of said slide member and said channel.

19. The seat track apparatus stated in claim 18, further comprising:

said slide member having a side wall and at least one cylindrical pin having a longitudinal axis, and said cylindrical pin being integral with and extending from said side wall of said slide member; and said side wall of said channel having at least one cylindrical aperture for receiving said cylindrical pin of said slide member for aligning and retaining said slide member in a plane normal to said longitudinal axis of said cylindrical pin.

* * * * *